(12) United States Patent
Peng

(10) Patent No.: US 11,838,349 B2
(45) Date of Patent: Dec. 5, 2023

(54) METHOD AND DEVICE FOR TRANSMITTING LIST INFORMATION

(71) Applicant: Hong Kong Sunstar Technology Co., Limited, Hong Kong (CN)

(72) Inventor: Yihao Peng, Beijing (CN)

(73) Assignee: HONG KONG SUNSTAR TECHNOLOGY CO., LIMITED, Hong Kong (CN)

( * ) Notice: Subject to any disclaimer, the term of this patent is extended or adjusted under 35 U.S.C. 154(b) by 0 days.

(21) Appl. No.: 17/337,203

(22) Filed: Jun. 2, 2021

(65) Prior Publication Data

US 2021/0289019 A1   Sep. 16, 2021

Related U.S. Application Data

(63) Continuation of application No. PCT/CN2018/119215, filed on Dec. 4, 2018.

(51) Int. Cl.
*H04L 67/02* (2022.01)
*H04L 67/55* (2022.01)
*H04L 67/75* (2022.01)

(52) U.S. Cl.
CPC .............. *H04L 67/02* (2013.01); *H04L 67/55* (2022.05); *H04L 67/75* (2022.05)

(58) Field of Classification Search
CPC .......... H04L 67/02; H04L 67/55; H04L 67/75
See application file for complete search history.

(56) References Cited

U.S. PATENT DOCUMENTS

| 4,855,580 A * | 8/1989 | Van Maanen, Jr. .... G06K 7/016 235/440 |
| 9,509,764 B1 | 11/2016 | Kolam |
| 10,769,103 B1 * | 9/2020 | Patwardhan .......... G06F 16/128 |
| 2009/0016342 A1 | 1/2009 | Miyazaki et al. |
| 2009/0091977 A1 * | 4/2009 | Hunt .................... G11C 16/102 365/185.08 |
| 2012/0019719 A1 | 1/2012 | Takesue et al. |
| 2013/0268831 A1 * | 10/2013 | Ruan ...................... H04L 67/02 715/205 |
| 2014/0067888 A1 * | 3/2014 | Oyama ............... G06F 16/9574 707/827 |

(Continued)

FOREIGN PATENT DOCUMENTS

| CN | 1617219 A | 5/2005 |
| CN | 1767520 A | 5/2006 |

(Continued)

OTHER PUBLICATIONS

Liu, "Realizing time synchronization of ATC automation system based on software method" issued on Air Traffic Management, Sep. 25, 2011; pp. 29-32; 2011/(9).

(Continued)

*Primary Examiner* — Jeong S Park

(57) ABSTRACT

A method and an apparatus for transmitting list information. The method includes sending a list information of a web page to a receiving end by using a two-way communication protocol. The two-way communication protocol does not need to use a fixed request response strategy for information transmission like the HTTP protocol, thus can improve the transmission efficiency of the list information of a web page.

16 Claims, 8 Drawing Sheets

(56) References Cited

U.S. PATENT DOCUMENTS

| | | |
|---|---|---|
| 2014/0223452 A1 | 8/2014 | Santhanam et al. |
| 2015/0319197 A1 | 11/2015 | Capt |
| 2017/0161387 A1* | 6/2017 | Schuchardt ............. G06F 1/163 |
| 2017/0171119 A1* | 6/2017 | Hattar ................... H04L 67/535 |
| 2021/0286801 A1* | 9/2021 | Peng ................... G06F 16/1744 |
| 2021/0287181 A1* | 9/2021 | Peng ................. G06F 16/24568 |

FOREIGN PATENT DOCUMENTS

| | | |
|---|---|---|
| CN | 103501485 A | 1/2014 |
| CN | 105468795 A | 4/2016 |
| CN | 105611424 A | 5/2016 |
| CN | 106202244 A | 12/2016 |
| CN | 106790717 A | 5/2017 |
| CN | 107071005 A | 8/2017 |
| CN | 107749861 A | 3/2018 |
| CN | 108667861 A | 10/2018 |
| GB | 2543279 A | 4/2017 |
| WO | 2007057053 A1 | 5/2007 |

OTHER PUBLICATIONS

Dong, "Research on Fault-tolerant of Time Synchronization Algorithm for Wireless Sensor Networks" issue on CMFD; Mar. 15, 2018; 56 pages.

Bogachev, "Blood pressure—Heart rate syncronization coefficient as a complementary indicator of baroreflex mechanism efficiency" issued on 2015 XVIII International Conference on Soft Computing and Measurements; Aug. 13, 2015; pp. 173-175.

Notice of the First Office Action dated Aug. 18, 2023 for Chinese Patent Application No. 201880099962.3.

* cited by examiner

METHOD AND DEVICE FOR TRANSMITTING LIST INFORMATION

CROSS-REFERENCE TO RELATED APPLICATION

This application is a continuation of International Application No. PCT/CN2018/119215, filed on Dec. 4, 2018, the disclosure of which is hereby incorporated by reference in its entirety.

TECHNICAL FIELD

The present application relates to the field of Internet, and in particular to a method and an apparatus for transmitting list information.

BACKGROUND

A web page may be used to display various information such as text, images, and sounds. List information is a typical web page information.

Different from static information on a web page, the list information of a web page sometimes changes dynamically according to time. Therefore, the list information of a web page requires higher communication or transmission efficiency for the sending end and the receiving end.

Related technologies usually use the hypertext transfer protocol (HTTP) to transmit the list information of a web page from the server to the page of the client, which is inefficient and difficult to meet the transmission requirements of the list information of a web page.

SUMMARY

The embodiments of the present disclosure provide a method for transmitting list information, which includes sending a list information of a web page to a receiving end by using a two-way communication protocol.

The two-way communication protocol does not need to use a fixed request response strategy for information transmission like the HTTP protocol, thus can improve the transmission efficiency of the list information of the web page.

In some implementations, the sending a list information of a webpage to a receiving end by using a two-way communication protocol comprises sending, in batches, the list information belonging to the same webpage to the receiving end by using the two-way communication protocol.

By adopting the batch transmission design, the users at the receiving end may see the preliminary list information in a short time, which improves the transmission performance of the list information of a web page.

In some implementations, the sending a list information of a webpage to a receiving end by using a two-way communication protocol comprises actively pushing the list information to the receiving end by using the two-way communication protocol.

By actively pushing, the real-time performance of the receiving end to receive the list information of a web page may be improved.

In some implementations, before the sending a list information of a webpage to a receiving end by using a two-way communication protocol, the method further comprises selecting a target record from a current list according to a difference between corresponding records in the current list and a historical list, wherein the list information comprises the target record.

According to the difference between the corresponding records in the current list and the history list, instead of directly transmitting the complete current list to the receiving end, the target record to be transmitted is selected, thus the transmission flexibility may be improved.

In some implementations, the selecting a target record from a current list according to a difference between corresponding records in the current list and a history list comprises selecting the target record from the current list according to the difference between the corresponding records in the current list and the history list, such that an amount of the target record is less than or equal to a first preset threshold.

By setting the upper limit of the number of target record, no matter whether the number of records in the current list is large or small, the amount of data that needs to be transmitted at the sending end and the receiving end is basically stable (i.e., basically maintained below the first preset threshold).

In some implementations, the selecting a target record from a current list according to a difference between corresponding records in the current list and a history list comprises selecting the target record from the current list according to the difference between the corresponding records in the current list and the history list, such that a data amount of the target record is less than or equal to a second preset threshold.

By setting the upper limit of the amount of transmitted data, the amount of data to be transmitted at the sending end and the receiving end is basically stable (i.e., basically below the second preset threshold), regardless of the amount of data in the current list is large or small.

In some implementations, the target record comprises a first record in which a specific data item is deleted, wherein the first record has a same value as the specific data item of a corresponding record in the history list.

By deleting specific data items that are not updated in the target record, the amount of data to be transmitted may be reduced or the target record may contain more information.

In some implementations, the target record is a partial record in the current list, the current list further comprises a remaining record except for the partial record, and a minimum value of a difference between the partial record and a corresponding record in the history list is greater than or equal to a maximum value of a difference between the remaining record and a corresponding record in the history list.

Compared with the remaining records, the target record is quite different from the corresponding record in the history list, so the target record may attract the attention of users more. By transmitting the target record to the receiving end without transmitting the remaining records, the amount of data to be transmitted may be reduced, and the transmission quality may not be affected.

In some implementations, the difference between the corresponding records of the current list and the history list are determined based on a difference value between target data items of the corresponding records of the current list and the history list.

In some implementations, the target data items comprise a plurality of data items, and the difference between the corresponding records in the current list and the history list is a weighted sum of the difference value between the plurality of data items in the corresponding records in the current list and the history list.

In some implementations, the target record comprises a newly added record and/or a deleted record relative to the history list.

In some implementations, the deleted record in the target record only contains a main field.

By omitting the contents of the deleted record except the main field, the amount of data to be transmitted may be reduced or the target record may contain more information.

In some implementations, before the sending a list information of a webpage to a receiving end by using a two-way communication protocol, the method further comprises merging a plurality of original time records in the current list into one target time record, wherein different object identifiers in the plurality of original time records correspond to different times, and each object identifier in the target time record corresponds to a same time, and the list information comprises the target time record.

By merging time records with different corresponding times into one target time record with the same corresponding time, the amount of data of time records may be reduced.

In some implementations, the merging a plurality of original time records in the current list into one target time record comprises adjusting a time accuracy of the plurality of original time records to obtain a plurality of intermediate time records corresponding to a same time, wherein the time accuracy of the original time records is a first time accuracy, a time accuracy of the intermediate time records is a second time accuracy, and the second time accuracy is smaller than the first time accuracy; and merging the plurality of intermediate time records into the target time record.

By adjusting the time accuracy of the original time records, the original time records, which cannot be merged, may be merged, so that the compression performance of the time records may be greatly improved under the condition of losing some time accuracy.

In some implementations, the adjusting a time accuracy of a plurality of original time records to obtain a plurality of intermediate time records corresponding to a same time comprises performing rounding off a time in the plurality of original time records according to the second time accuracy to obtain the plurality of intermediate time records.

In some implementations, a time length corresponding to the second time accuracy is greater than an update cycle of the original time records.

When the time length corresponding to the second time accuracy is greater than the update cycle of the original time records, the intermediate time records obtained after the accuracy adjustment will either remain unchanged from the time record before updating, or be adjusted to the same time, so that most or even all of the intermediate time records may be merged into one target time record, which greatly reduces the amount of data of the time record.

In some implementations, the plurality of original time records are time records in which the current list is updated relative to the historical list, and an object identifier in the target time record is an object identifier in time records in which the current list is not updated relative to the historical list, wherein an amount of the object identifiers in the time records in which the current list is updated relative to the historical time record is greater than an amount of object identifiers in the time records in which the current list is not updated relative to the historical time record.

Since the number of object identifiers in the time records updated relative to the historical time record is greater than that in the time records not updated relative to the historical time record, recording object identifiers in the time records not updated relative to the historical time record in the target time record may not only calculate the updated time record relative to the historical time record (which is equivalent to recording the updated time record relative to the historical time record), but also reduce the amount of data of the time record.

In some implementations, the two-way communication protocol is a websocket protocol.

The embodiments of the present disclosure also provide a method for transmitting list information, which includes receiving a list information of a webpage from a sending end by using a two-way communication protocol.

In some implementations, the receiving a list information of a webpage from a sending end by using a two-way communication protocol comprises receiving, in batches, the list information belonging to the same webpage from the sending end by using the two-way communication protocol; the method further comprises displaying the list information on the same page in an additional display manner according to a receiving order of the list information.

In some implementations, the receiving a list information of a webpage from a sending end by using a two-way communication protocol comprises receiving the list information actively pushed by the sending end by using the two-way communication protocol.

In some implementations, the two-way communication protocol is a websocket protocol.

The embodiments of the present disclosure also provide an apparatus for transmitting list information, which includes a transmission module configured for sending a list information of a web page to a receiving end by using a two-way communication protocol.

In some implementations, the transmission module is configured for sending, in batches, the list information belonging to the same webpage to the receiving end by using the two-way communication protocol.

In some implementations, the transmission module is configured for actively pushing the list information to the receiving end by using the two-way communication protocol.

In some implementations, the apparatus further comprises a selecting module configured for selecting a target record from a current list according to a difference between corresponding records in the current list and a historical list before the sending a list information of a web page to a receiving end by using a two-way communication protocol, wherein the list information comprises the target record.

In some implementations, selecting the target record from the current list according to the difference between the corresponding records in the current list and the history list, such that an amount of the target record is less than or equal to a first preset threshold.

In some implementations, the selection module is configured for selecting the target record from the current list according to the difference between the corresponding records in the current list and the history list, such that a data amount of the target record is less than or equal to a second preset threshold.

In some implementations, the target record comprises a first record in which a specific data item is deleted, wherein the first record has a same value as the specific data item of a corresponding record in the history list.

In some implementations, the target record is a partial record in the current list, and the current list further comprises a remaining record except for the partial record, and a minimum value of a difference between the partial record and a corresponding record in the history list is greater than or equal to a maximum value of a difference between the remaining record and a corresponding record in the history list.

In some implementations, the difference between the corresponding records of the current list and the history list are determined based on a difference value between target data items of the corresponding records of the current list and the history list.

In some implementations, the target data items comprise a plurality of data items, and the differences between the corresponding records in the current list and the history list are a weighted sum of the difference value between the data items in the corresponding records in the current list and the history list.

In some implementations, the target record comprises a newly added record and/or a deleted record relative to the history list.

In some implementations, the deleted record in the target record only contains a main field.

In some implementations, the apparatus further comprises a merging module configured for merging a plurality of original time records in the current list into one target time record before the sending a list information of a webpage to a receiving end by using a two-way communication protocol, wherein different object identifiers in the plurality of original time records correspond to different times, and each object identifier in the target time record corresponds to a same time, and the list information comprises the target time record.

In some implementations, the merging module is configured for adjusting a time accuracy of the plurality of original time records to obtain a plurality of intermediate time records corresponding to a same time, wherein the time accuracy of the original time records is a first time accuracy, a time accuracy of the intermediate time records is a second time accuracy, and the second time accuracy is smaller than the first time accuracy; and merging the plurality of intermediate time records into the target time record.

In some implementations, the merging module is configured for performing rounding off a time in the plurality of original time records according to the second time accuracy to obtain the plurality of intermediate time records.

In some implementations, a time length corresponding to the second time accuracy is greater than an update cycle of the original time records.

In some implementations, the plurality of original time records are time records in which the current list is updated relative to the historical list, and an object identifier in the target time record is an object identifier in time records in which the current list is not updated relative to the historical list, wherein an amount of the object identifiers in the time records in which the current list is updated relative to the historical time record is greater than an amount of object identifiers in the time records in which the current list is not updated relative to the historical time record.

In some implementations, the two-way communication protocol is a websocket protocol.

The embodiments of the present disclosure also provide an apparatus for transmitting list information, which includes a receiving module configured for receiving a list information of a webpage from a sending end by using a two-way communication protocol.

In some implementations, the receiving module is configured for receiving, in batches, the list information belonging to the same webpage from the sending end by using the two-way communication protocol; the apparatus further comprises a display module configured for displaying the list information on the same page in an additional display manner according to a receiving order of the list information.

In some implementations, the receiving module is configured for receiving the list information actively pushed by the sending end by using the two-way communication protocol.

In some implementations, the two-way communication protocol is a websocket protocol.

The embodiments of the present disclosure also provide a computer (or server or terminal), which includes the above-mentioned apparatus for transmitting the list information.

The embodiments of the present disclosure also provide an electronic device, which includes at least one processor and a memory in communication with the at least one processor; the memory has instructions executable by the at least one processor stored therein, and when the instructions are executed by the at least one processor, the at least one processor is caused to perform the above method for transmitting list information.

The embodiments of the present disclosure also provide a computer-readable storage medium, which is characterized by storing computer-executable instructions, and the computer-executable instructions are arranged to perform the above method for transmitting list information.

The embodiments of the present disclosure also provide a computer program product, which is characterized in that the computer program product includes program instructions, and when the program instructions are executed by a computer, the computer is caused to perform the above method for transmitting list information.

BRIEF DESCRIPTION OF DRAWINGS

One or more embodiments are illustrated by the corresponding drawings. These illustrative descriptions and drawings do not constitute a limitation on the embodiments. Elements with the same reference numerals in the drawings are shown as similar elements, and the drawings do not constitute a scale limitation. And in these drawings.

DESCRIPTION OF THE EMBODIMENTS

In order to understand the characteristics and technical contents of the embodiments of the present disclosure in more detail, the implementation of the embodiments of the present disclosure will be described in detail with reference to the accompanying drawings, which are for reference only and are not intended to limit the embodiments of the present disclosure. In the following technical description, for convenience of explanation, a number of details are used to provide a thorough understanding of the disclosed embodiments. However, one or more embodiments may still be implemented without these details. In other cases, in order to simplify the drawings, well-known structures and apparatuses may be simplified for display.

Figure 1:
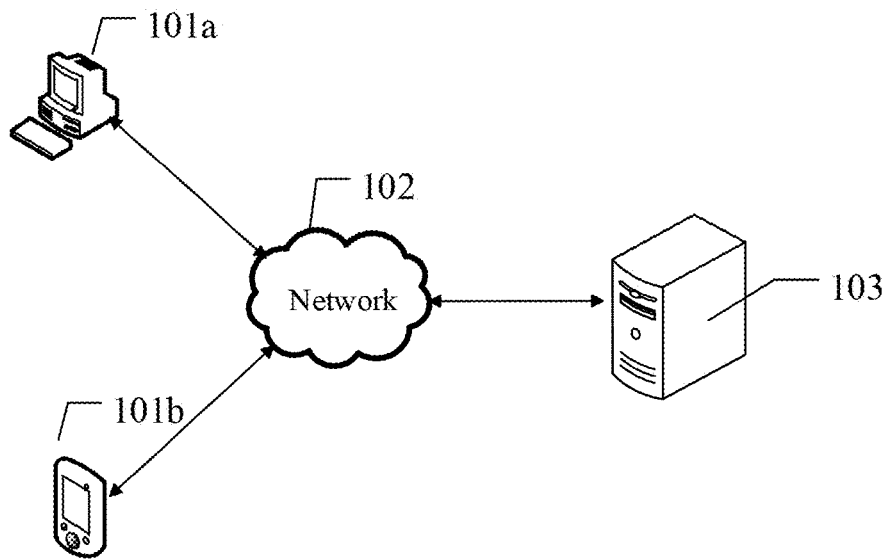
FIG. 1 is an exemplary diagram of an application scenario according to an embodiment of the present disclosure.

With reference to FIG. 1, an application scenario of an embodiments of the present disclosure will be illustrated below.

FIG. 1 shows a network system. The network system includes a client 101 and a server 103. The client 101 and the server 103 may be in communication connection through a wired or wireless network 102.

In the embodiments of the present disclosure, the types of the client 101 and the server 103 are not limited. For example, the client 101 may be a fixed terminal 101a or a mobile terminal 101b. In some embodiments, the client 101 may also refer to software running on the terminal 101, such as a browser, a web page, or an APP running on the terminal 101. For convenience of description, no matter which implementation is adopted, it will be collectively referred to as a client in the embodiments of the present disclosure. In the embodiments of the present disclosure, the type of the server 103 is not limited, which may be an application server or a storage server.

Taking FIG. 2 as an example, the generation and transmission process of list information will be illustrated below.

Figure 2:
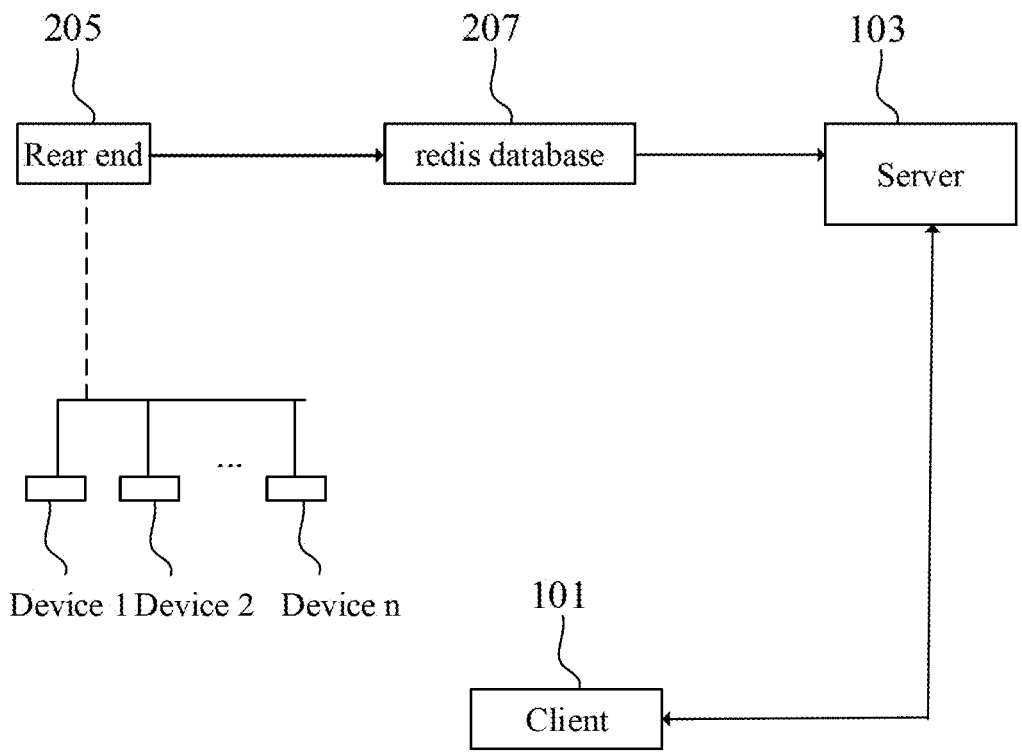
FIG. 2 is another exemplary diagram of an application scenario according to an embodiment of the present disclosure.

As shown in FIG. 2, the rear end (or data source) 205 may obtain the running status information (such as CPU occupancy rate, memory occupancy rate and the like) of the monitored devices (such as device 1-device n in FIG. 2). In addition, the rear end 205 may write the running status information of each device into the redis database 207 at a specific frequency (e.g., 15 seconds/time or 40 seconds/time). The redis database 207 may record the running status information of the devices in a list manner to form the list information of these devices. The redis database 207 is only an example, and the database 207 may also be other types of databases, such as a memcached storage system, a NoSOL database, and the like. When the device list in the redis database is updated, a message may be pushed to a subscriber of the redis database (such as the server 103) to inform the subscriber that the information of the redis database has been updated.

The server 103 may establish a websocket service for monitoring requests from the client 101. When the client 101 is connected to the server 103, the server 103 may subscribe to the running status information of the device 1-device n from the redis database to obtain a device list containing the running status information of the devices. Then, the server 103 may transmit the device list to the client 101. For example, the server 103 may first transmit the initial device list to the client 101. This process may be called the first transmission of list information. Whenever the device list is updated, the server 103 may transmit the updated device list to the client 101. This process may be called the second transmission or update transmission of list information. The second transmission process may be once or a plurality of times. No matter whether it is the first transmission or the second transmission, the server 103 may transmit the device list according to the request of the client 101, or actively push the device list to the client 101.

The client 101 (in this example, since the server 103 communicates with the client based on the websocket protocol, the client may also be referred to as a websocket client or a websocket app) may display the device list on the page of the client 101. In some embodiments, the client 101 may also search for information in the device list displayed on the page, or sort the device list, and the like.

Generally speaking, each row (or column) of a list may be called a record. Each column (or row) of the list may be called a field. Each field in a record may be called a data item. A list usually has a main field, which is used to distinguish different records in the list. The main field may be one field in the list or a combination of a plurality of fields in the list. Records may also exist relatively independently in other forms of data sets, and are not limited to lists.

Table 1 is an example of the device list in the device running status monitoring system shown in FIG. 2:

TABLE 1

| Device No. | CPU occupancy rate | Memory occupancy | Device temperature | Submission time |
|---|---|---|---|---|
| 1568 | 30% | 0.5 GB | 40° C. | 2018 May 10 11:21:42 |
| 1329 | 70% | 1 GB | 60° C. | 2018 May 10 11:22:01 |
| 3421 | 50% | 0.7 GB | 50° C. | 2018 May 10 11:20:01 |
| 4560 | 40% | 0.6 GB | 45° C. | 2018 May 10 11:20:23 |

Each row in Table 1 represents a record. The device number is the main field, which is used to distinguish the records of different devices. The CPU occupancy rate and memory occupancy are all data items. The content in the record may depend on the application and is not limited to the information related to the devices. For example, the recorded content may be stock information or remaining ticket information.

HTTP is a one-way network protocol, which requires the receiving end (such as the client) and the sending end (such as the server) to transmit information in a request-response manner. The list information of a web page often changes or is updated in real time. For example, the running status of monitored device will be updated in real time, the stock market will fluctuate over time, and the information of remaining tickets will often change with the continuous booking and refund of tickets by users. One-way communication mechanism based on HTTP will lead to low transmission efficiency of list information of a web page.

The embodiments of the present disclosure provide a method for transmitting list information, which may improve the transmission efficiency of list information. The method will be described in detail with reference to FIG. 3.

Figure 3:
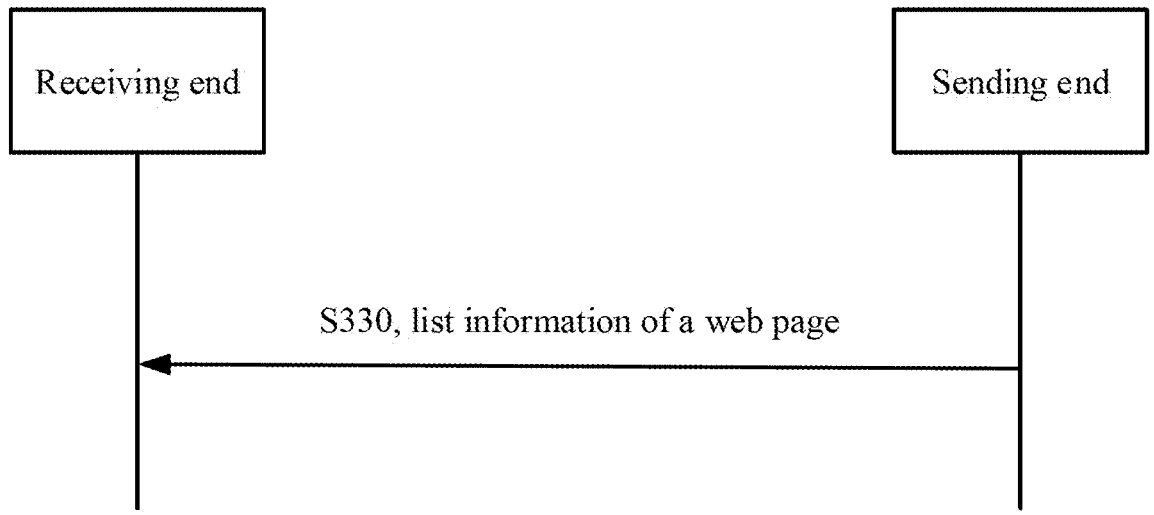
FIG. 3 is a schematic flowchart of a method for transmitting list information according to an embodiment of the present disclosure.

FIG. 3 is a schematic flowchart of a method for transmitting list information according to an embodiment of the present disclosure. The sending end in FIG. 3 may be various forms of software or hardware capable of transmitting list information. For example, the sending end may refer to a server or software on the server. In some embodiments, the sending end may also be called the server. The receiving end in FIG. 3 may be various forms of software or hardware capable of receiving list information. For example, the receiving end may refer to a terminal device (such as a mobile phone), or may also refer to desktop software, a mobile phone application, a web page application, and the like. In some embodiments, the receiving end may also be called a client or a web page client.

A network may be used to communicate between the sending end and the receiving end. The network may be a wireless network or a wired network. The communication protocol between the sending end and the receiving end is a two-way communication protocol. The two-way communication protocol means that the sending end may actively send information to the receiving end, and the receiving end may also actively send information to the receiving end. Under the two-way communication protocol, the communication mode between the sending end and the receiving end becomes very flexible, and the sending end may not only transmit information to the receiving end according to the request of the receiving end, but also actively push information to the receiving end. The flexible communication mode may significantly improve the efficiency of information transmission at the sending end and the receiving end.

The communication protocols at the sending end and the receiving end are not specifically limited in the embodiments of the present disclosure, and may be any network protocol that supports two-way communication (or duplex communication). For example, the two-way communication protocol may be a websocket protocol. In this case, the sending end may be called a websocket server, and the receiving end may be called a websocket receiving end. Alternatively, the two-way communication protocol may be a BiHppt protocol.

Referring to FIG. 3, in step S330, the sending end may send the list information of a web page to the receiving end by using the two-way communication protocol. The two-way communication protocol does not need to use a fixed request response strategy for information transmission like the HTTP protocol, thus can improve the transmission efficiency of the list information of the web page.

As an example, before step S330 is executed, the sending end may receive a request from the receiving end which requests the sending end to transmit the list information of a web page. As another example, the sending end may actively send (or push) the list information of a web page to the receiving end.

Assuming that the list information of a web page is updated over time, the list information of a web page may be divided into the first transmission and the second transmission. During the first transmission, the sending end may transmit the list information of a web page to the receiving end according to the request of the sending end. After the first transmission, the sending end may actively push the updated list information to the receiving end whenever the list information is updated.

The updated list information is transmitted by active push, so that the receiving end may easily monitor the dynamically changing list information without performing any operations (under the HTTP protocol, the user needs to actively update the page, or update the page by polling, which is complicated in operation and high in network overhead).

In some embodiments, the sending end may first compress a web page list information to be transmitted, and then transmit it to the receiving end, thereby reducing the amount of transmitted data.

If the list information of the same web page is transmitted by HTTP, when the amount of data of the list information is large, the receiving end usually has to wait for a long time before displaying the list information on the page. The reason is that the information transmitted based on HTTP protocol cannot (or is very difficult to) be displayed before being downloaded by the receiving end. For example, if a page contains several megabytes of list information, it usually takes several tens of seconds for the receiving end to download the list information, which means that the user needs to wait several tens of seconds to see the list information on a web page, and the waiting time is relatively long. In order to solve this problem, related technologies usually display list information (for example, list information with a large amount of data) in pages.

The paging display of the list information will cause a lot of inconvenience. For example, if the user at the receiving end wants to sort the records in the list information, since the receiving end does not have complete list information due to paging display, it may only sort the records in paging, which is often of little practical value. If the user requests the sending end to sort the complete list information and transmit the sorting result to the receiving end, the sorted list information needs to be received again from the sending end, which leads to low sorting efficiency and large delay. For another example, the use of paging display leads to the lack of complete list information at the receiving end, so that users at the receiving end cannot search for desired information from the complete list information. If the search function is implemented by the sending end, it will increase the communication burden between the sending end and the sending end, and the implementation is complicated and inefficient.

In order to alleviate the above problems, in some embodiments, the sending end may send the list information belonging to the same web page to the receiving end in batches by using the two-way communication protocol. Accordingly, the receiving end may receive the list information belonging to the same web page from the sending end in batches by using the two-way communication protocol; and according to the receiving order of the list information, the list information is displayed on the same page in an additional display manner.

The embodiments of the present disclosure adopt a batch transmission design, so that the user at the receiving end may see the preliminary list information in a short time, and then the receiving end may continuously display the list information of a web page in an additional display manner. The use of batch transmission design may alleviate the jamming and long loading time that may occur when loading and displaying page list information at one time, thus improving the transmission performance of the sending end and the receiving end.

When adopting the batch transmission design, the amount of information transmitted in each batch is not specifically limited in the embodiments of the present disclosure, and may be determined according to factors such as network conditions and the amount of data contained in each record in the list information. For example, every N (an integer not less than 1) records in the list information may be sent as a batch. Assuming that a page contains several megabytes of list information, if the HTTP protocol is used for transmission, it may take several tens of seconds for the receiving end to finish loading and displaying the page list information. With the batch transmission mode according to the embodiments of the present disclosure, the receiving end may display the preliminary list information within several seconds, and complete the loading of the complete list information within the following several ten to tens of seconds.

Optionally, in some embodiments, the sending end may send the records in the list information one by one to the receiving end; the sending end may display the records one by one on the page in an additional manner.

Optionally, the list information of the same page mentioned above may be complete list information. After receiving the complete list information, the receiving end may browse the complete list information by scrolling without turning pages, thus simplifying the operation of the user at the receiving end.

Since the receiving end has obtained the complete list information, the user at the receiving end may use the search function of the receiving end (such as the browser's own search function) to search for the desired information from the complete list information. Optionally, the user at the receiving end may use the sorting function of the receiving end (such as the sorting function of the browser) to sort the list information. Of course, in some embodiments, some personalized data analysis or statistical functions may be developed for the receiving end, so that the receiving end can use the complete list information it receives to perform more complex analysis or processing on the data.

List information may include many records. In the related art, whenever a record is updated, the sending end usually transmits the updated current list to the receiving end completely, so that the sending end may update its stored history list. This mode of direct transmission without selection has poor flexibility. For example, in the actual network transmission process, no matter whether the sending end and the receiving end use broadband Internet or mobile Internet, the channel between them is always subject to various limitations, such as the limitation of channel bandwidth or data flow. Uncontrolled transmission of a large amount of information will lead to long transmission delays, and even transmission failures. Therefore, it is very important to transmit the current list selectively.

There is a fact that helps to select the target record to be transmitted from the current list, that is, in a limited time, the amount of information that a person can handle is often limited. Therefore, they tend to focus only on what is worth paying attention to. For example, for the device running status monitoring system described in FIG. 2, the user may be concerned about the contents in the device list that change drastically (or change to a greater extent); for other scenarios, the user may be concerned about the content in the list that changes gently (or to a less extent). A possible embodiment that can improve the flexibility of the sending end and the receiving end is given below with reference to FIG. 4.

Figure 4:
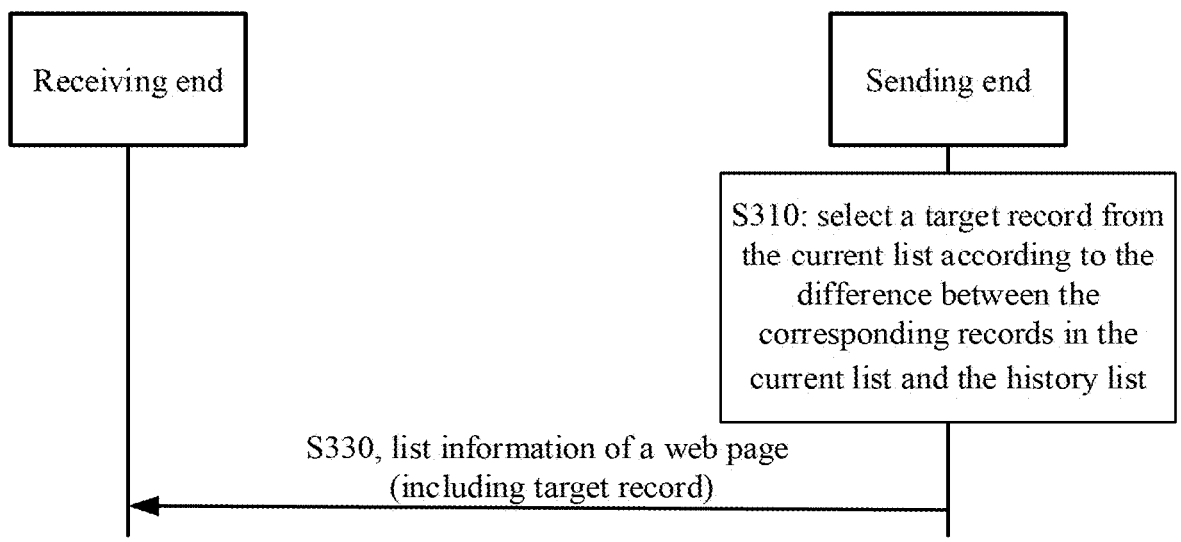
FIG. 4 is a schematic flowchart of a method for transmitting list information according to another embodiments of the present disclosure.

FIG. 4 is a schematic flowchart of a method for transmitting list information according to an embodiment of the present disclosure. In step S310, a target record is selected from the current list according to the difference between the corresponding records in the current list and the history list. The list information of a web page transmitted in step S330 may include the target record selected in step S310.

According to the difference between the corresponding records in the current list and the history list, instead of directly transmitting the complete current list to the receiving end without selection, the target record to be transmitted is selected, thus the transmission flexibility may be improved. Of course, in the embodiments of the present disclosure, if it is considered that the current list needs to be transmitted to the receiving end after comparing the difference between the corresponding records in the current list and the historical list, the complete current list may also be transmitted to the receiving end.

The target record may contain some or all of the records in the current list. For example, the target record may contain records with large difference in the current list or records with small difference in the current list. In other words, in some embodiments, some records may be selected for transmission according to the difference between the current list and the historical list, so as to reduce the amount of data to be transmitted. The method for selecting the target record will be described in detail below with reference to the embodiments, and will not be described in detail here.

The history list may be a list that has been transmitted to the receiving end. As an example, the history list may be the latest list stored by the receiving end after the previous transmission, or the history list may be the list of an earlier version stored by the receiving end. For example, if the process of transmitting list information from the sending end to the receiving end is divided into the first transmission, the first update transmission . . . the nth update transmission, the history list may refer to the list transmitted for the first time. For the nth update transmission, the history list may refer to the list stored by the receiving end after the previous n-1 transmissions. Alternatively, in some embodiments, for the nth transmission, the history list may also refer to the list obtained after the previous n-k transmissions (k is greater than 1). The value of k may be negotiated in advance by the sending end and the receiving end.

Both the current list and the history list may include a plurality of records. During the record update process, the main field usually remains unchanged. Therefore, the corresponding records between the current list and the history list may be determined according to the main fields in the current list and the history list. For example, records with the same main fields in the current list and the history list are corresponding records. If the main field changes, it may be understood that a record in the history list is deleted and a newly added record is added to the current list.

Each record in the current list and the history list may contain one or more data items (which may be one or more data items other than the main field). The difference between the corresponding records in the current list and the history list may be determined based on the difference between the target data items of the corresponding records in the current list and the history list, and may also be determined based on the ratio of the target data items of the corresponding records in the current list and the history list, which is not limited in the embodiments of the present disclosure. The target data items may include any one or more data items in the record.

Assuming that the target data items include a plurality of data items, the difference between the corresponding records in the current list and the history list may be the weighted sum of the difference of the plurality of data items in the corresponding records in the current list and the history list. For example, the difference between each data item recorded in the plurality of data items in the current list and the history list may be calculated; then, according to the importance or other indexes of the data items, the corresponding weights may be assigned to the data items, and the difference corresponding to the data items may be weighted and summed by these weights as the difference of the corresponding records. In some embodiments, the difference of the corresponding records may be represented by numerical values, so as to facilitate the comparison of the difference of the corresponding records.

The difference between two data items may be calculated according to the data type of the data stored in the data item.

For example, if the data type of the data stored in two data items is numeric, the difference between the two data items may be the difference between the numerical values in the two data items or the absolute value of the difference. The data, which is a real number, in a data item and the data in its corresponding unit may be regarded as numerical data. Before calculating the difference between two numerical data, the unit may be unified. In the process of calculating the difference between two numerical data, we may directly calculate the difference between the numerical values without considering the unit.

For another example, if the data type of the data stored in the two data items is time, the difference between the two data items may be the time difference between the time in the two data items. The time difference may be accurate to any one of seconds, minutes, hours or days.

For another example, if the data types of the data stored in two data items are character strings with fixed length, the binary representation of the character strings in the two data items may be regarded as an integer, and then the difference between the two data items may be calculated by using the difference calculation method for numerical data mentioned above.

For another example, if the data type of the data stored in two data items is a character string with unfixed length, the target length of the character string may be defined first. When the length of the character string in a certain data item is shorter than the target length, the binary 0 byte (0x00) may be added after the character string to make it reach the target length. When the length of a string in a data item is longer than the target length, part of the tail characters of the string may be discarded to make it reach the target length. Then, the difference between two data items may be calculated by using the above-mentioned difference calculation method for character string type with fixed length.

There may be a plurality of ways to select the target record in step S310.

Optionally, as a possible implementation, the target record may be selected from the current list according to the difference between the corresponding records in the current list and the history list, so that the number of target record is less than or equal to the first preset threshold.

The first preset threshold may be the maximum number of records allowed to be transmitted (for example, 1000). The first preset threshold may be set according to experience or actual situation. For example, the first preset threshold may be set according to one or more of the following factors: the network status between the sending end and the receiving end, the traffic cost required in the transmission process, and the like. Optionally, in some embodiments, the value of the first preset threshold may be flexibly adjusted according to the actual situation. If the number of records in the current list is less than the first preset threshold, all the current lists may be transmitted to the receiving end.

By setting the above maximum threshold, no matter the number of records in the current list is large or small, the amount of data that needs to be transmitted at the sending end and the receiving end is basically stable (below the first preset threshold).

Optionally, as another possible implementation, the target record may be selected from the current list according to the difference between the corresponding records in the current list and the history list, so that the amount of data of the target record is less than or equal to the second preset threshold (or the amount of data of the target record is within the preset range).

Different from the previous implementation, this implementation controls the number of target record to be transmitted from the perspective of amount of data, which can better ensure the stability of the amount of data transmitted by the sending end and the receiving end (maintained below the second preset threshold).

The first preset threshold and the second preset threshold mentioned above may also be determined according to the update frequency of the current list. For example, according to the update frequency of the current list, the number of records or amount of data that can be processed by the user in the previous and next update processes may be calculated, so as to determine the values of the first preset threshold and the second preset threshold. For example, assuming that the update frequency of the current list is 15 seconds, and the user can generally process 20 records in 15 seconds, the first preset threshold may be defined as 20; for another example, assuming that the update frequency of the current list is 45 seconds, and the user can generally process records corresponding to 100k data in 45 seconds, the second preset threshold may be defined as 100k.

The target record may be a record in the current list that has a larger difference than the corresponding records in the history list, a record with a smaller difference, or a record whose difference meets other preset conditions, such as a record whose difference fluctuates repeatedly during several consecutive transmissions, which is not limited in the embodiments of the present disclosure. As an example, the target record is a partial record in the current list, the current list also includes the remaining records except for some records, and a minimum value of a difference between the partial record and a corresponding record in the history list is greater than or equal to a maximum value of a difference between the remaining record and a corresponding record in the history list. Compared with the remaining records, the target record is quite different from the corresponding record in the history list, so the target record may attract the attention of users more. By transmitting the target record to the receiving end without transmitting the remaining records, the amount of data to be transmitted may be reduced, and the transmission quality may not be affected.

The target record may include records in the current list that have a corresponding relationship with the history list (such records may be referred to as update records), and may also include records newly added to the history list and/or records deleted from the relative history list. The newly added record refers to the record contained in the current list, but the record is not included in the history list. A deleted record refers to a record that is not included in the current list, but exists in the history list.

When selecting the target record, the above-mentioned newly added record and/or deleted record may also be taken into account, so that even if a large number of newly added record and/or deleted record are included, the amount of data to be transmitted at the sending end and the receiving end may basically remain stable. For example, the first preset threshold may be the total number of updated records, newly added record and deleted record. After receiving the updated record in the target record, the receiving end may use the updated record to replace the corresponding records in the history list. After receiving the newly added record, the receiving end may insert the newly added record into the local record. After receiving the deleted record, the receiving end may delete the corresponding records in the history list. The updated record or deleted record and corresponding record in the history list may be searched based on the main fields of records.

Optionally, the deleted record to be transmitted may only contain the main field to reduce the amount of data to be transmitted.

In order to facilitate the selection of the target record, the current list may be sorted in ascending order or descending order of the difference according to the difference between the corresponding records of the current list and the history list.

Optionally, in some embodiments, the target record may include a first record in which a specific data item is deleted, and the first record has the same value as the specific data item of the corresponding records in the history list. The first record has the same value as the specific data item of the record corresponding to the first record in the history list, which means that the specific data item in the first record has not been updated, and the specific data item may not be transmitted, so that the target record may contain more information. After receiving the first record, if the receiving end judges that the first record lacks a specific data item, it defaults that the value in the specific data item has not been updated, and there is no need to replace it.

Optionally, the sending end may use the target record to update the locally saved history list so that it may be used in the next transmission. In this way, if a certain record in the current list is not selected as the target record, the probability of this record being selected as the target record next time will increase, so that the transmission probability of each record will not deviate too much.

Optionally, before the receiving end transmits the target record, the target record may be compressed (using a general compression method) to reduce the amount of data of the target record.

The list information to be transmitted often contains a large number of time records. Taking Table 1 as an example, the device number and submission time in the device list constitute the time record of each tested device, as follows:
    (2018-05-10 11:21:42, 1568)
    (2018-05-10 11:22:01, 1329)
    (2018-05-10 11:20:01, 3421)
    (2018-05-10 11:20:23, 4560)

Among them, "1568", "1329", "3421", and "4560" are the device numbers of different devices; "2018-05-10 11:21:42", "2018-05-10 11:22:01", "2018-05-10 11:20:01" and "2018-05-10 11:20:23" are the time corresponding to the above devices (the update time of the running status).

There are many forms of time records, and the above is just an example. Common time records usually include two basic elements: time and the object identifier of the object to which the time belongs. The meanings of the time and object identifier in the time record will vary with different applications, which is not limited in the embodiments of the present disclosure. For example, in the device running status monitoring system, the time in the time record may refer to the update time of the monitored device running status, and the object identifier in the time record may refer to the device number of the monitored device.

In the above example, "1568" in the time record (2018-05-10 11:22:33, 1568) is the object identifier of the time record, and "2018-05-10 11:22:33" is the time corresponding to the object identifier.

Assuming that the update frequency of the device list is 15 seconds, the server 103 will generate a large number of time records every day, and the transmission of thousands of time records will occupy a large amount of network resources.

Time records and other records in the list information may be processed separately. Other records may be sent directly to the receiving end (or compressed in other ways and sent to the receiving end). And time records may be compressed by the methods described in FIGS. 5-9 below and then transmitted to the receiving end.

Figure 5:
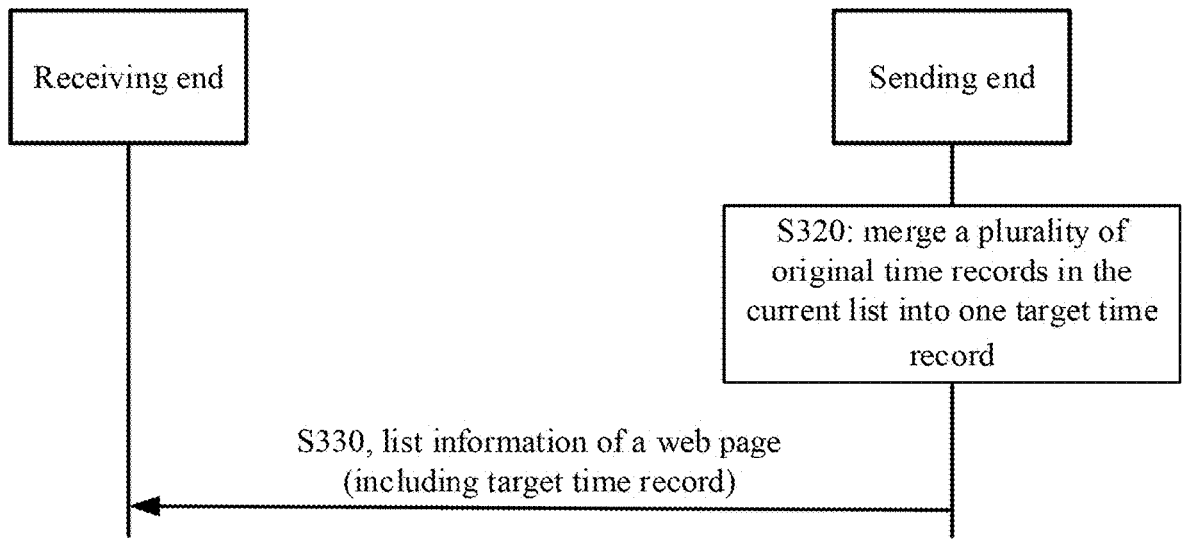
FIG. 5 is a schematic flowchart of a method for transmitting list information according to another embodiments of the present disclosure.

As shown in FIG. 5, in step S320, a plurality of original time records in the current list are merged into one target time record. Among them, different object identifiers in a plurality of original time records correspond to different times, and each object identifier in the target time record corresponds to the same time. The list information of a web page transmitted in step S330 may include the target time record obtained after processing in step S320.

Since the object identifiers in the plurality of original time records correspond to different times, the effect of compressing the plurality of original time records using related technologies is limited. The embodiments of the present disclosure are equivalent to modifying the time in some or all of the plurality of original records, so that the time in the modified time records becomes the same time, and these modified time records may be merged together to form a target time record. The embodiments of the present disclosure may effectively reduce the consumption of network resources (such as network bandwidth) or data traffic in the transmission process of time records, so that the time records can be quickly and accurately transmitted to the receiving end.

In some embodiments, the original time records may be a single-object time record (that is, the original time records may include an object identifier), and the merged target time record may be a multi-object time record (that is, the target time record may include a plurality of object identifiers).

The object identifier in the target time record may be the object identifier in the original time records or other object identifiers that can be indexed to the object identifiers in the original time records, which is not limited in the embodiments of the present disclosure.

For example, assuming that a plurality of original time records are updated relative to historical time records, the object identifier in the target time record may be either the object identifier of the plurality of original time records or the object identifier of the time record whose relative historical time records are not updated. For example, when the number of object identifiers in a time record in which the relative historical time record is updated is greater than that in a time record in which the relative historical time record is not updated, the object identifier in the target time record may be set as the object identifier in the time record in which the relative historical time record is not updated. Since the number of object identifiers in a time record in which the relative historical time record is updated is greater than that in a time record in which the relative historical time record is not updated, recording the object identifier in the time record in which the relative historical time record is not updated in the target time record may not only be indexed to the object identifier of the time record in which the relative historical time record is updated, but also reduce the amount of data of the time record. The historical time record mentioned here may be a time record that has been acquired before, or a time record that has been sent to the receiving end before. For example, the historical time record may be the time record previously sent to the receiving end.

There are various implementations of step S320, which is not limited in the embodiments of the present disclosure. As an example, one time record may be selected from a plurality of original time records, and the time of the selected time record is taken as the reference time, and the time of other original time records in the plurality of original time records may be adjusted to the reference time.

Figure 6:
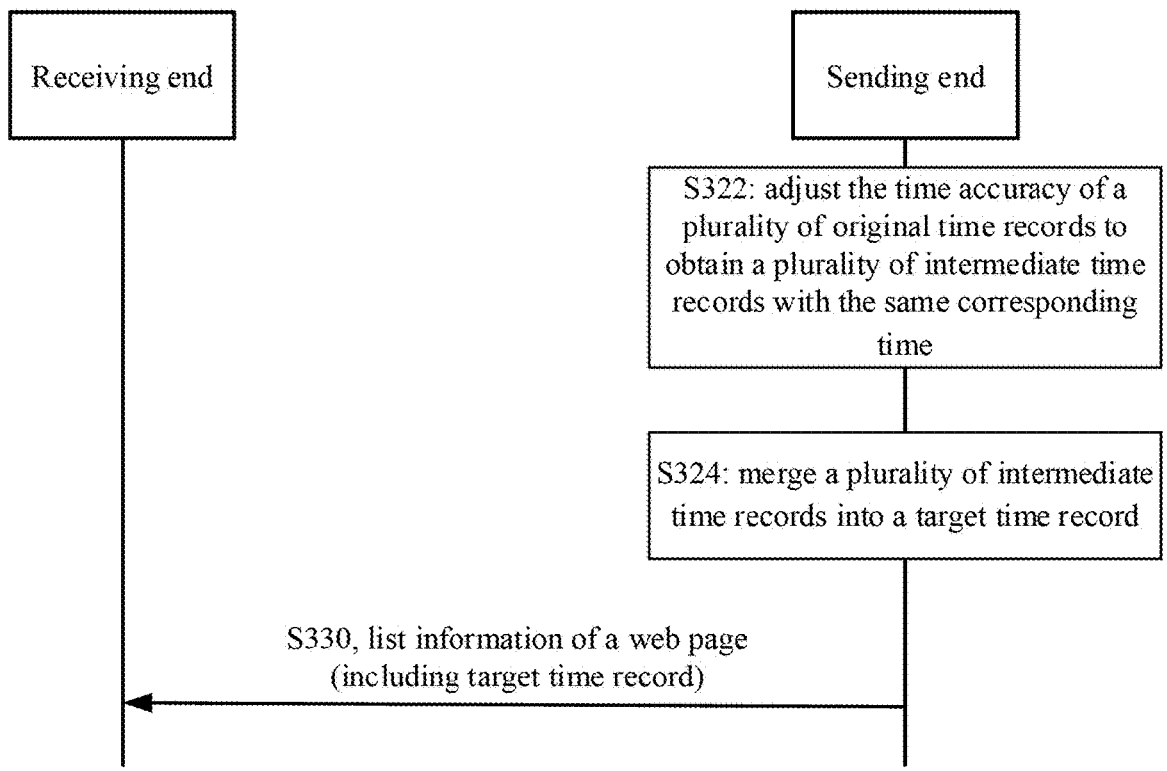
FIG. 6 is a schematic flowchart of a method for transmitting list information according to another embodiments of the present disclosure.

As another example, as shown in FIG. 6, steps S322-S324 may be used to merge the plurality of original time records into one target time record.

In step S322, the time accuracy of a plurality of original time records is adjusted to obtain a plurality of intermediate time records with the same corresponding time.

The time accuracy of the original time records may be the first time accuracy, and the time accuracy of the intermediate time records may be the second time accuracy. The second time accuracy is less than the first time accuracy.

The setting method for the second time accuracy is not limited in the embodiments of the present disclosure. For example, if the first time accuracy is "1 second", the second time accuracy may be set to "1 minute" or "30 seconds".

Optionally, in some embodiments, assuming that the original time records are updated according to a certain cycle, the time length corresponding to the second time accuracy may be set to be greater than the update cycle of the original time records.

When the time length corresponding to the second time accuracy is greater than the update cycle of the original time records, the intermediate time records obtained after the accuracy adjustment will either remain unchanged from the time record before updating, or be adjusted to the same time, so that most or even all of the intermediate time records may be merged into one target time record, which greatly reduces the amount of data of the time record.

For example, assuming that the original time records are updated every 40 seconds, if the second time accuracy is greater than 40 seconds (for example, 1 minute), the time of the adjusted intermediate time records will either remain unchanged compared with the time record before updating, or be adjusted to the next minute.

The adjustment may round off the time recorded in the original time according to the second time accuracy, or it may round down but not round up the time recorded in the original time according to the second time accuracy, or it may round up but not round down the time recorded in the original time according to the second time accuracy, which is not limited in the embodiments of the present disclosure.

In step S324, a plurality of intermediate time records are merged into a target time record.

For example, assume that the original time records to be processed include the following time records:
 (2018-05-10 11:21:42, 1568)
 (2018-05-10 11:22:01, 1329)
 (2018-05-10 11:20:01, 3421)
 (2018-05-10 11:20:23, 4560)

The time accuracy of the above original time records to be processed is "seconds" (corresponding to the first time accuracy mentioned above). In order to merge more time records together, the time accuracy of the original time records may be rounded off, so that the time accuracy of all time records is kept to "minutes" (corresponding to the second time accuracy mentioned above), and the following intermediate time records are obtained:

(2018-05-10 11:22:00, 1568)
 (2018-05-10 11:22:00, 1329)
 (2018-05-10 11:20:00, 3421)
 (2018-05-10 11:20:00, 4560)

Among the above intermediate time records, the first two intermediate time records correspond to the same time "2018-05-10 11:22:00", and the last two intermediate time records correspond to the same time "2018-05-10 11:20:00".

Then, the intermediate time records with the same corresponding time may be merged into one target time record to obtain the following two target time record:
 (2018-05-10 11:22:00, {1329, 1568});
 (2018-05-10 11:20:00, {3421, 4560}).

The embodiments of the present disclosure can reduce the amount of data of time recording, thereby reducing the consumption of storage resources by time recording.

In the scenario where the time record is transmitted through the network, if the time records are updated in real time, the sending end usually transmits the initial time records to the receiving end first. This process may be called the first transmission of time records. Then, when the time record is updated, the sending end will transmit the updated time record to the receiving end again. This process may be called the second transmission or update transmission of time records. In FIG. 2, the device list is taken as an example to give an example of the first transmission and the second transmission of time records. Please refer to the previous paragraph for a detailed description.

Either the first transmission of the time record or the second transmission of the time record may be performed as shown in FIG. 4. For the second transmission, the sending end may transmit in the same way as the first transmission, that is, transmit a complete time record to the receiving end. Alternatively, the sending end may transmit the time records updated relative to the historical time record to the receiving end, but do not transmit the time records not updated relative to the historical time record. In addition, the sending end may also transmit one or more of a newly added time record and a deleted time record to the receiving end.

Optionally, the deleted time record transmitted to the receiving end may include the object identifier instead of the time, so as to reduce the amount of data to be transmitted.

Figure 7:
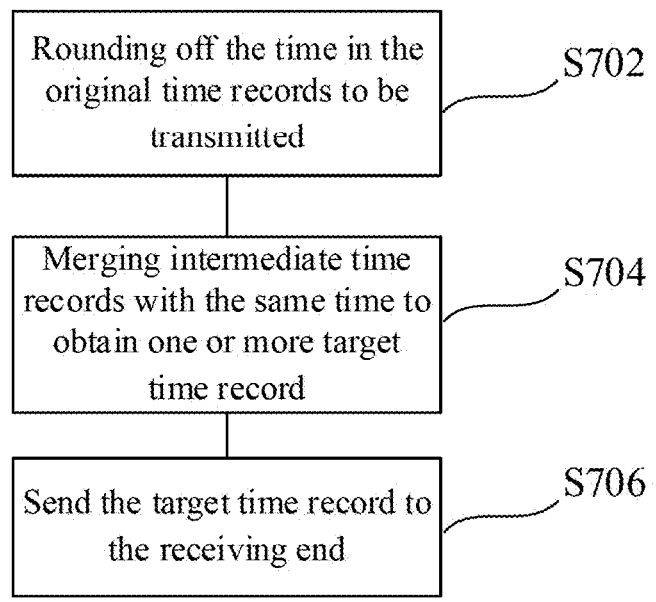
FIG. 7 is a schematic flowchart of a method for transmitting time records according to an embodiment of the present disclosure.

With reference to FIG. 7, the first transmission process of time records will be illustrated in more detail below. The steps in FIG. 7 are executed by the sending end.

In step S702, the time in the original time records to be transmitted is rounded off.

For example, assuming that the acceptable time error at the receiving end is one minute, the seconds of the time in the original time records may be rounded off to the accuracy level of minutes. Alternatively, if the acceptable time error at the receiving end is 30 seconds, the seconds of the time in the original time records may be rounded off to the accuracy level of 30 seconds.

Assume that the original time records to be transmitted is as follows:
 (2018-05-10 11:21:42, 1568)
 (2018-05-10 11:22:01, 1329)
 (2018-05-10 11:20:01, 3421)
 (2018-05-10 11:20:23, 4560)

After the time in the original time records is rounded to the accuracy level of minutes, the intermediate time records are obtained:
 (2018-05-10 11:22:00, 1568)
 (2018-05-10 11:22:00, 1329)
 (2018-05-10 11:20:00, 3421)
 (2018-05-10 11:20:00, 4560)

In step S704, the intermediate time records with the same time are merged to obtain one or more target time record.

For example, assume that the intermediate time is recorded as follows:
(2018-05-10 11:22:00, 1568)
(2018-05-10 11:22:00, 1329)
(2018-05-10 11:20:00, 3421)
(2018-05-10 11:20:00, 4560)
(2018-05-10 11:30:00, 2356)

Then the target time record obtained after the merging is as follows:
(2018-05-10 11:22:00, {1329, 1568})
(2018-05-10 11:20:00, {3421, 4560})
(2018-05-10 11:30:00, 2356)

In step S706, the target time record is sent to the receiving end. It may be seen that compared with the original time records to be transmitted, the amount of data of the time record to be transmitted is greatly reduced by transmitting the target time record.

For the receiving end, it only needs to restore the target time record containing a plurality of object identifiers to a single-object time record.

Figure 8:
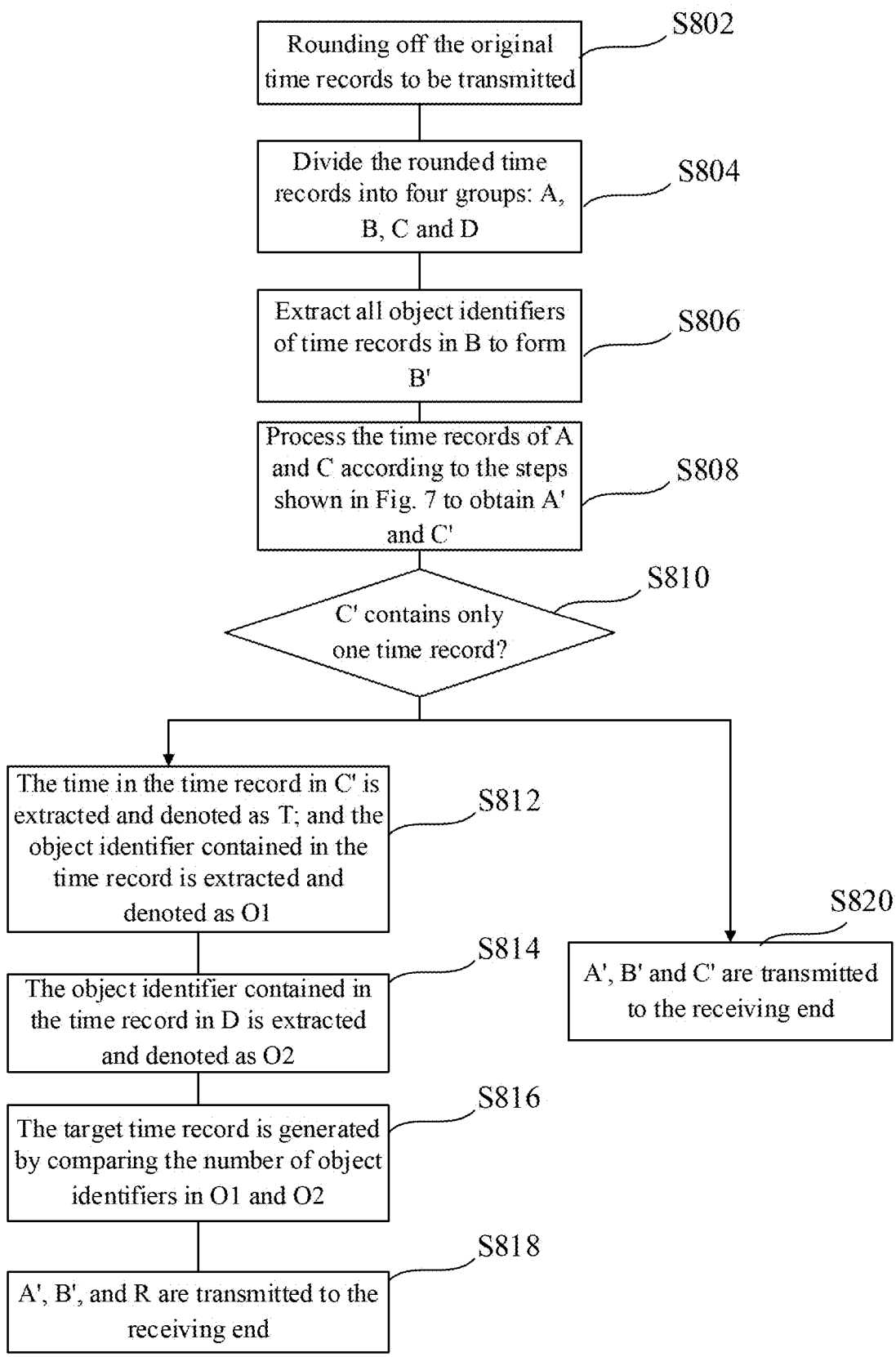
FIG. 8 is a schematic flowchart of a processing flow at a sending end in a method for transmitting time records according to another embodiments of the present disclosure.
Figure 9:
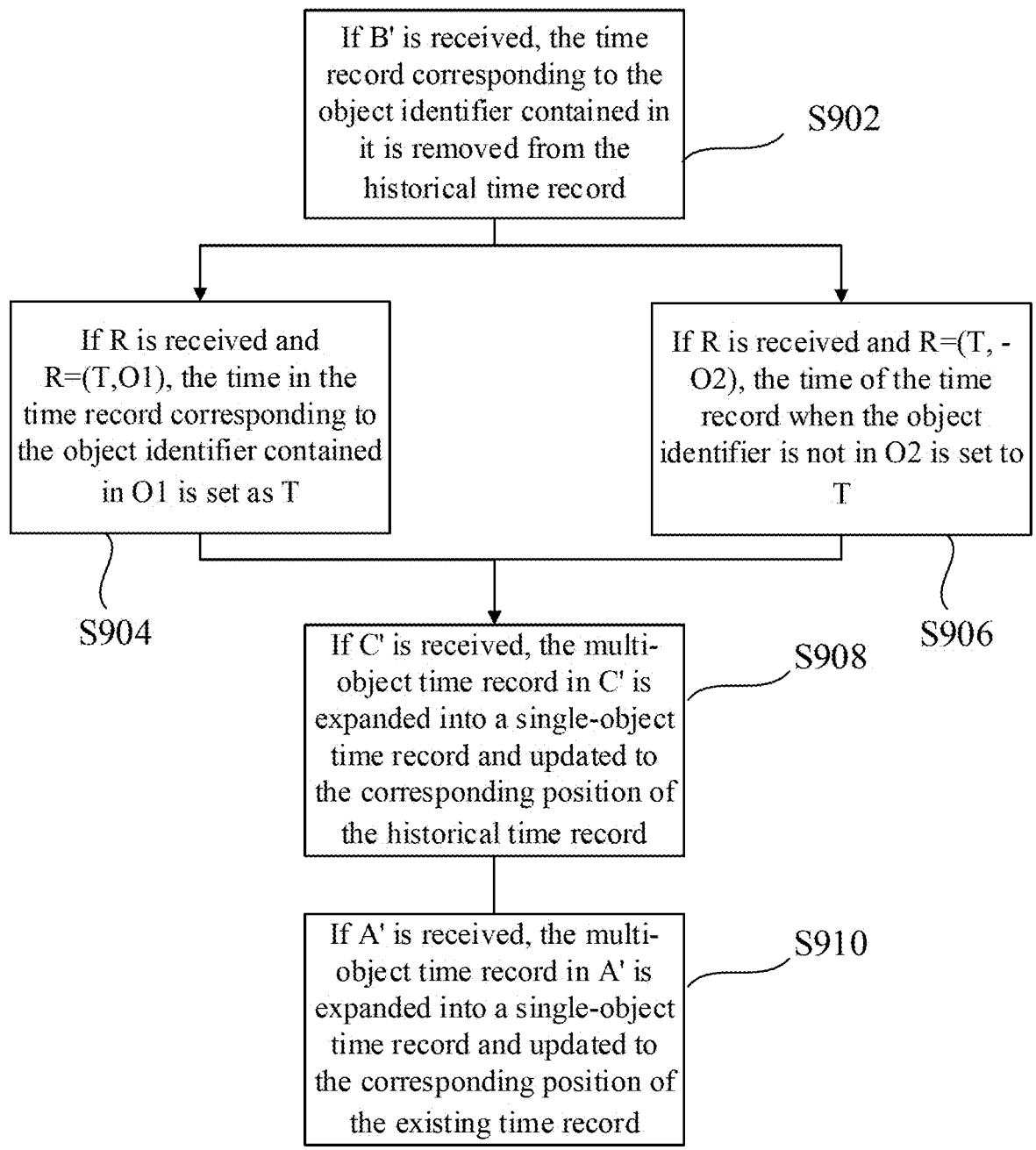
FIG. 9 is a schematic flowchart of a processing flow at a receiving end corresponding to FIG. 8.

The second transmission process of the time record will be illustrated in more detail below with reference to FIGS. 8-9. The flow in FIG. 8 is executed by the sending end, and the flow in FIG. 9 is executed by the receiving end.

In step S802, the original time records to be transmitted is rounded off

Assume that the original time records to be transmitted is:
(2018-05-10 11:23:15, 340)
(2018-05-10 11:23:21, 1568)
(2018-05-10 11:22:57, 1329)
(2018-05-10 11:20:03, 3421)
(2018-05-10 11:23:09, 4560)

The original time records to be transmitted may be rounded off, so that the time in these time records is accurate to minutes, then we get:
(2018-05-10 11:23:00, 340)
(2018-05-10 11:23:00, 1568)
(2018-05-10 11:23:00, 1329)
(2018-05-10 11:20:00, 3421)
(2018-05-10 11:23:00, 4560)

In step S804, the time records after the rounding-off process are divided into 4 groups: A, B, C, and D.
A: the newly added time record relative to the historical time record;
B: the deleted time record relative to the historical time record;
C: the updated time record relative to the historical time record;
D: the time record not updated relative to the historical time record.

In this example, the historical time record refers to the time record of the previous transmission, but the embodiments of the present disclosure are not limited to this. The sending end may take any time record of the previous transmission as the historical time record, as long as the sending end and the receiving end negotiate in advance.

Assume that the historical time record is:
(2018-05-10 11:22:00, 1568)
(2018-05-10 11:22:00, 1329)
(2018-05-10 11:20:00, 3421)
(2018-05-10 11:20:00, 4560)
(2018-05-10 11:30:00, 2356)

Comparing the historical time records with the rounded-off time records obtained in step S802, the following four groups of time records may be obtained:

A=(2018-05-10 11:23:00, 340);
B=(2018-05-10 11:30:00, 2356);
C=(2018-05-10 11:23:00, 1568), (2018-05-10 11:23:00, 1329), (2018-05-10 11:23:00, 4560);
D=(2018-05-10 11:20:00, 3421).

In step S806, all object identifiers of time records in B are extracted to form B'. For example, B' can be represented in the form of "-{b1, b2, b3, . . . }", where b1, b2, b3 are object identifiers, and "-" represents deletion. This representation omits the transmission of the time of the deleted time record, which may reduce the amount of data of time records to be transmitted.

For example, by processing B=(2018-05-10 11:30:00, 2356) according to step S806, B'=-{2356} may be obtained.

In step S808, the time records of A and C are processed according to the steps shown in FIG. 7 to obtain A' and C'.

For example, according to step S808, A=(2018-05-10 11:23:00, 340) and C=(2018-05-10 11:23:00, 1568), (2018-05-10 11:23: 00, 1329), (2018-05-10 11:23:00, 4560) are processed, then we may get:
A'=(2018-05-10 11:23:00, 340).
C'=(2018-05-10 11:23:00, {1568, 1329, 4560}).

In step S810, if C' contains a time record, jump to step S812. If C' contains a plurality of time records, jump to step S820.

For example, if C'=(2018-05-10 11:23:00, {1568, 1329, 4560}), which contains a time record, then jump to step S812.

In step S812, the time in the time record in C' is extracted and denoted as T; and the object identifier contained in the time record is extracted and denoted as O1.

For example, C'=(2018-05-10 11:23:00, {1568, 1329, 4560}). After step S812, the following results are obtained:
T=2018-05-10 11:23:00;
O1={1568, 1329, 4560}.

In step S814, the object identifier contained in the time record in D is extracted and denoted as O2.

For example, if D=(2018-05-10 11:20:00, 3421), then after step S814, O2={3421} is obtained.

In step S816, the target time record is generated by comparing the number of object identifiers in O1 and O2. If the number of object identifiers in O1 is less than that in O2, a target time record R=(T, O1) is generated. Otherwise, the target time record R=(T, -O2) is generated.

For example, comparing O2={3421} and O1={1568, 1329, 4560}, it may be seen that the number of object identifiers in O2 is less than the number of object identifiers in O1, so the target time record obtained by step S816 is R=(2018-05-10 11:23:00, -{3421}).

In step S818, A', B' and R are transmitted to the receiving end.

Therefore, after step S818, the sending end transmits the following time records to the receiving end:
A'=(2018-05-10 11:23:00, 340);
B'=-{2356};
R=(2018-05-10 11:23:00, -{3421}).

In step S820, A', B' and C' are transmitted to the receiving end.

FIG. 9 shows the processing flow of the receiving end in the second transmission process.

In step S902, if B' is received, the time record corresponding to the object identifier contained in it is removed from the historical time record.

For example, assume that the time record obtained from the previous transmission (that is, the historical time record) is:
(2018-05-10 11:22:00, 1568)
(2018-05-10 11:22:00, 1329)
(2018-05-10 11:20:00, 3421)
(2018-05-10 11:20:00, 4560)
(2018-05-10 11:30:00, 2356)
The received time record is as follows:
A'=(2018-05-10 11:23:00, 340);
B'=−{2356};
R=(2018-05-10 11:23:00, −{3421}).

After step S902, (2018-05-10 11:30:00, 2356) may be removed from the time record, and the remaining time records are as follows:
(2018-05-10 11:22:00, 1568)
(2018-05-10 11:22:00, 1329)
(2018-05-10 11:20:00, 3421)
(2018-05-10 11:20:00, 4560)

In step S904, if R is received and R=(T, O1), the time in the time record corresponding to the object identifier contained in O1 is set to T.

In step S906, if R is received and R=(T, −O2), the time of the time record when the object identifier is not in O2 is set to T.

For example, the format of R=(2018-05-10 11:23:00, −{3421}) conforms to R=(T, −O2), therefore, step S906 is executed, and all the time of the time records whose object identifiers are not "3421" in the historical time records are set as "2018-05-21 11:23:00", and the following results are obtained:
(2018-05-10 11:23:00, 1568)
(2018-05-10 11:23:00, 1329)
(2018-05-10 11:20:00, 3421)
(2018-05-10 11:23:00, 4560)

In step S908, if C' is received, the multi-object time record in C' is expanded into a single-object time record and updated to the corresponding position of the historical time record.

In step S910, if A' is received, the multi-object time record in A' is expanded into a single-object time record and updated to the corresponding position of the existing time record.

For example, A'=(2018-05-10 11:23:00, 340) may be added to the existing time record, and the following results may be obtained:
(2018-05-10 11:23:00, 1568)
(2018-05-10 11:23:00, 1329)
(2018-05-10 11:20:00, 3421)
(2018-05-10 11:23:00, 4560)
(2018-05-10 11:23:00, 340)

The above mainly adopts "year-month-day hour: minute: second" to represent time, and adopts Arabic numerals to represent object identifiers, but the embodiments of the present disclosure are not limited to this.

For example, time may be represented in digital representation, such as unix timestamp. Alternatively, the time and object identifier may be represented in binary.

In the embodiments of the present disclosure, the amount of data of the time record is compressed to obtain the target time record. In some embodiments, the target time record may also be compressed by using a general compression algorithm to reduce the amount of data of the time record to a greater extent.

The method embodiments of the present disclosure are described in detail above with reference to FIGS. 1 to 9, and the apparatus embodiments of the present disclosure are described in detail below with reference to FIGS. 10 to 12. The description of the method embodiment corresponds to the description of the apparatus embodiment, so for parts not described in detail, please refer to the previous method embodiment.

Figure 10:
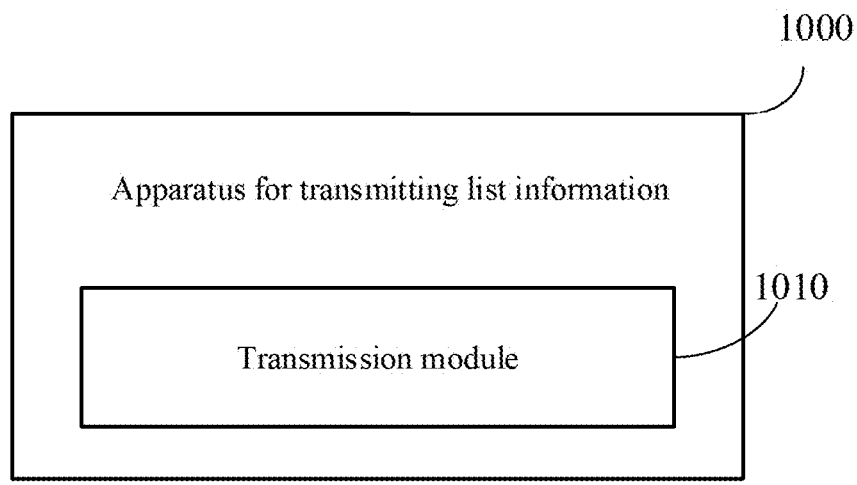
FIG. 10 is a structural diagram of an apparatus for transmitting list information according to an embodiment of the present disclosure.

FIG. 10 is a structural diagram of an apparatus for transmitting list information according to an embodiment of the present disclosure. The apparatus 1000 may perform the above actions performed by the sending end. As shown in FIG. 10, the apparatus 1000 includes a transmission module 1010, which is configured for sending a list information of a web page to a receiving end by using a two-way communication protocol.

Optionally, the transmission module is configured for sending, in batches, the list information belonging to the same webpage to the receiving end by using the two-way communication protocol.

Optionally, the transmission module is configured for actively pushing the list information to the receiving end by using the two-way communication protocol.

Optionally, the apparatus 1000 may further include a selection module configured for selecting a target record from a current list according to a difference between corresponding records in the current list and a historical list before the sending a list information of a web page to a receiving end by using a two-way communication protocol, wherein the list information comprises the target record.

Optionally, the selection module is configured for the selection module is configured for selecting the target record from the current list according to the difference between the corresponding records in the current list and the history list, such that an amount of the target record is less than or equal to a first preset threshold.

Optionally, the selection module is configured for selecting the target record from the current list according to the difference between the corresponding records in the current list and the history list, such that a data amount of the target record is less than or equal to a second preset threshold.

Optionally, the target record comprises a first record in which a specific data item is deleted, wherein the first record has a same value as the specific data item of a corresponding record in the history list.

Optionally, the target record is a partial record in the current list, and the current list further comprises a remaining record except for the partial record, and a minimum value of a difference between the partial record and a corresponding record in the history list is greater than or equal to a maximum value of a difference between the remaining record and a corresponding record in the history list.

Optionally, the difference between the corresponding records of the current list and the history list are determined based on a difference value between target data items of the corresponding records of the current list and the history list.

Optionally, the target data items comprise a plurality of data items, and the differences between the corresponding records in the current list and the history list are a weighted sum of the difference value between the data items in the corresponding records in the current list and the history list.

Optionally, the target record comprises a newly added record and/or a deleted record relative to the history list.

Optionally, the deleted record in the target record only contains a main field.

Optionally, the apparatus 1000 may further include a merging module configured for merging a plurality of original time records in the current list into one target time record before the sending a list information of a webpage to a receiving end by using a two-way communication protocol, wherein different object identifiers in the plurality of original time records correspond to different times, and each object identifier in the target time record corresponds to a same time, and the list information comprises the target time record.

Optionally, the merging module is configured for adjusting a time accuracy of the plurality of original time records to obtain a plurality of intermediate time records corresponding to a same time, wherein the time accuracy of the original time records is a first time accuracy, a time accuracy of the intermediate time records is a second time accuracy, and the second time accuracy is smaller than the first time accuracy; and merging the plurality of intermediate time records into the target time record.

Optionally, the merging module is configured for performing rounding off a time in the plurality of original time records according to the second time accuracy to obtain the plurality of intermediate time records.

Optionally, a time length corresponding to the second time accuracy is greater than an update cycle of the original time records.

Optionally, the plurality of original time records are time records in which the current list is updated relative to the historical list, and an object identifier in the target time record is an object identifier in time records in which the current list is not updated relative to the historical list, wherein an amount of the object identifiers in the time records in which the current list is updated relative to the historical time record is greater than an amount of object identifiers in the time records in which the current list is not updated relative to the historical time record.

Optionally, the two-way communication protocol is a websocket protocol.

Figure 11:
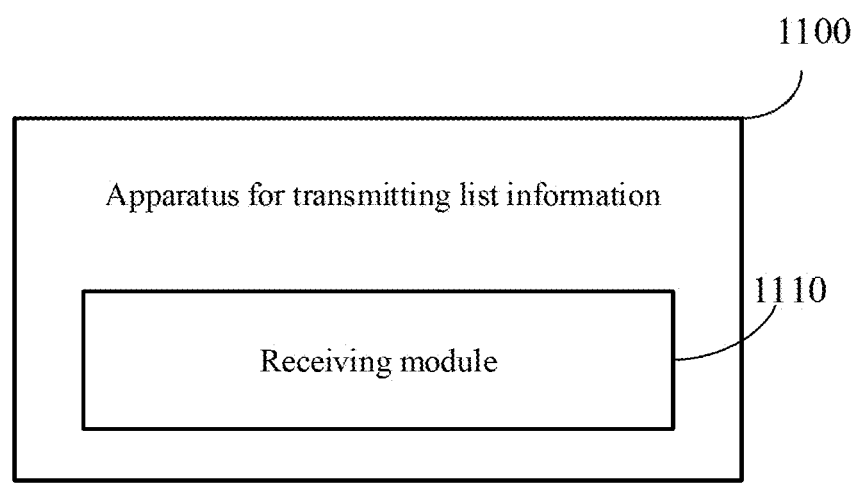
FIG. 11 is a schematic structural diagram of an apparatus for transmitting list information according to another embodiments of the present disclosure.

FIG. 11 is a schematic structural diagram of an apparatus for transmitting list information according to another embodiments of the present disclosure. The apparatus 1100 may perform the above actions performed by the receiving end. The apparatus 1100 may include a receiving module 1110 configured for receiving a list information of a webpage from a sending end by using a two-way communication protocol.

Optionally, the receiving module 1110 is configured for receiving, in batches, the list information belonging to the same webpage from the sending end by using the two-way communication protocol; the apparatus 1100 further comprises a display module configured for displaying the list information on the same page in an additional display manner according to a receiving order of the list information.

Optionally, the receiving module 1110 is configured for receiving the list information actively pushed by the sending end by using the two-way communication protocol.

Optionally, the two-way communication protocol is a websocket protocol.

The embodiments of the present disclosure also provide a computer-readable storage medium, which stores computer-executable instructions, and the computer-executable instructions are arranged to perform the above method for transmitting list information.

Embodiments of the present disclosure also provide a computer program product, which includes program instructions, and when the program instructions are executed by a computer, the computer is caused to perform the above method for transmitting list information.

The above-mentioned computer-readable storage medium may be a transient computer-readable storage medium or a non-transient computer-readable storage medium.

Figure 12:
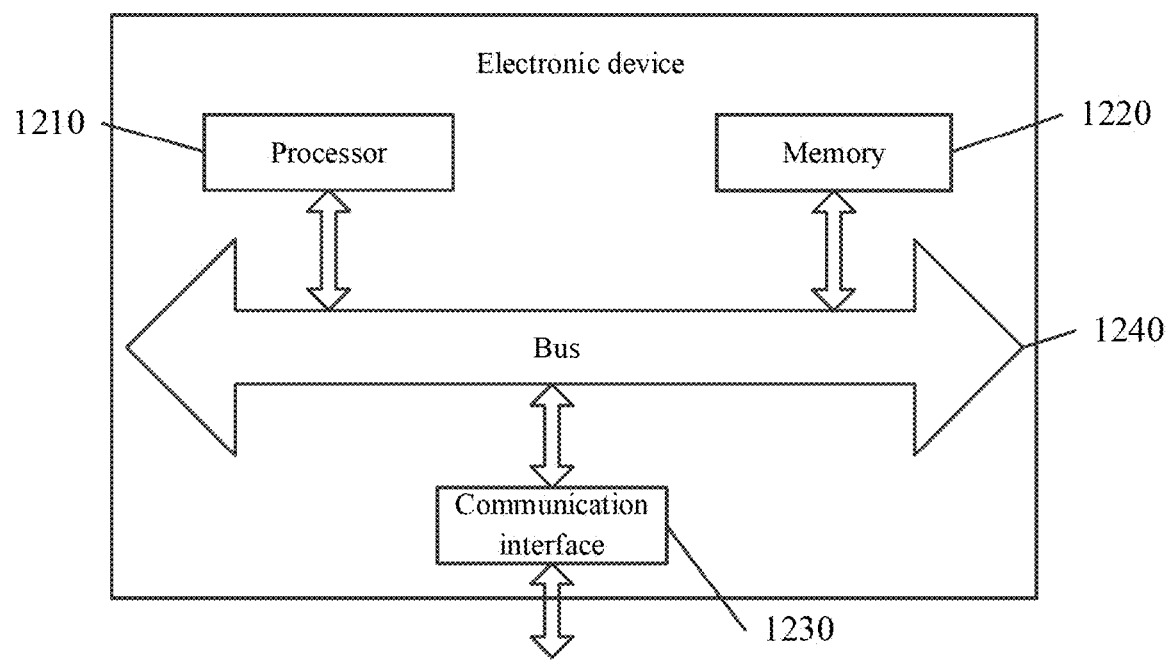
FIG. 12 is a schematic structural diagram of an electronic device according to an embodiment of the present disclosure.

The embodiments of the present disclosure also provide an electronic device, the structure of which is shown in FIG. 12, and the electronic device may be used to execute the above-mentioned actions performed by the sending end and/or the receiving end. The electronic device includes:

at least one processor 1210, one processor 1210 is taken as an example in FIG. 12; a memory 1220; and may further include a communication interface 1230 and a bus 1240. The processor 1210, the communication interface 1230, and the memory 1220 may communicate with each other through the bus 1240. The communication interface 1230 may be used for information transmission. The processor 1210 may call logic instructions in the memory 1220 to execute the method for transmitting records in the above embodiments.

In addition, the logic instructions in the above-mentioned memory 1220 may be implemented in the form of software functional units and may be stored in a computer-readable storage medium when sold or used as an independent product.

As a computer-readable storage medium, the memory 1220 may be used to store software programs and computer-executable programs, such as program instructions/modules corresponding to the methods in the embodiments of the present disclosure. The processor 1210 executes functional applications and data processing by running software programs, instructions and modules stored in the memory 1220, i.e., implements the method for transmitting list information in the above method embodiments.

The memory 1220 may include a program storage area and a data storage area. The program storage area may store an operating system and an application program required by at least one function; the data storage area may store data created according to the use of the terminal device. In addition, the memory 1220 may include a high-speed random access memory, and may also include a non-volatile memory.

In some embodiments, the current list mentioned above may be a device list. The device in the device list may be a "digital voucher" processing device. When the digital voucher is related to digital currency or embodied as digital currency, the digital voucher processing device may be a digital currency mining machine, and the digital currency may be encrypted currency such as Bitcoin.

The technical schemes of the embodiments of the present disclosure may be embodied in the form of a software product, which is stored in a storage medium, and the software product includes one or more instructions to make a computer device (which may be a personal computer, a server, or a network device and the like) execute all or part of the steps of the method described in the embodiments of the present disclosure. The above-mentioned storage media may be a non-transient storage media, including an USB flash drive, a mobile hard disk, a Read-Only Memory (ROM), a Random Access Memory (RAM), a magnetic disk, an optical disk, or another medium that may store program codes, and may also be a transient storage media.

In the present application, although the terms "first", "second" and the like may be used to describe various elements, these elements should not be limited by these terms. These terms are only used to distinguish one element from another. For example, without changing the meaning of the description, the first element may be called the second element, and the second element may be called the first element, as long as all existing "first element" are renamed consistently and all existing "second component" are renamed consistently. The first element and the second element are both elements, but may not be the same element.

The words used in the present application are only used to describe the embodiments and are not used to limit the claims. As used in the description of the embodiments and claims, the singular forms "a", "an" and "the" are intended to include the plural forms as well, unless the context clearly indicates. Similarly, the term "and/or" as used in the present application is meant to encompass any and all possible combinations of one or more associated listed items. In addition, when used in the present application, the term "include" and its variants "includes" and/or "including" and the like refer to the presence of stated features, integers, steps, operations, elements, and/or components, but do not exclude the presence or addition of one or more other features, integers, steps, operations, elements, components and/or groups thereof.

Various aspects, implementations or features in the described embodiments can be used alone or in any combination. Various aspects in the described embodiments may be implemented by software, hardware, or a combination of hardware and software. The described embodiments may also be embodied by a computer-readable medium storing computer-readable code including instructions executable by at least one computing device. The computer-readable medium can be associated with any data storage device capable of storing data that may be read by a computer system. The computer-readable medium, for example, may be a read-only memory, a random access memory, a CD-ROM, a HDD, a DVD, a magnetic tape, an optical data storage device, and the like. The computer-readable medium may also be distributed in computer systems connected through a network, so that the computer-readable code may be stored and executed in a distributed manner.

The above technical description may refer to the accompanying drawings, which form a part of the present application, and through the description, the accompanying drawings show implementations in accordance with the described embodiments. Although these embodiments are described in sufficient detail to enable those skilled in the art to implement these embodiments, these embodiments are non-limiting; in this way, other embodiments may be used and changes may be made without departing from the scope of the described embodiments. For example, the order of operations described in the flowchart is non-limiting, so the order of two or more operations illustrated in in the flowchart and described according to the flowchart may be changed according to some embodiments. As another example, in some embodiments, one or more operations illustrated in the flowchart and described according to the flowchart are optional or may be deleted. In addition, certain steps or functions may be added to the disclosed embodiments, or the order of two or more steps may be replaced. All these changes are considered to be included in the disclosed embodiments and the claims.

In addition, terminology is used in the above technical description to provide a thorough understanding of the described embodiments. However, it does not require too much detail to implement the described embodiments. Therefore, the above description of embodiments is presented for illustration and description. The embodiments presented in the above description and the examples disclosed according to these embodiments are provided separately to add context and help understand the described embodiments. The above description is not intended to be exhaustive or to limit the described embodiments to a precise form of the present disclosure. According to the above teachings, modifications, alternative applications and changes are feasible. In some cases, well-known processing steps have not been described in detail to avoid unnecessarily affecting the described embodiments.

What is claimed is:

1. A method for transmitting list information, comprising:
   selecting a target record from a current list according to a difference between corresponding records in the current list and a historical list, wherein the target record is a partial record in the current list, the current list further comprises a remaining record except for the partial record, and a minimum value of a difference between the partial record and a corresponding record in the history list is greater than or equal to a maximum value of a difference between the remaining record and a corresponding record in the history list;
   sending, in batches, list information belonging to a same web page to a receiving end by using a two-way communication protocol, wherein the list information comprises the target record.

2. The method according to claim 1, wherein the sending list information comprises:
   actively pushing the list information to the receiving end by using the two-way communication protocol.

3. The method according to claim 1, wherein the selecting a target record from a current list according to a difference between corresponding records in the current list and a history list comprises:
   selecting the target record from the current list according to the difference between the corresponding records in the current list and the history list, such that an amount of the target record is less than or equal to a first preset threshold.

4. The method according to claim 1, wherein the selecting a target record from a current list according to a difference between corresponding records in the current list and a history list comprises:
   selecting the target record from the current list according to the difference between the corresponding records in the current list and the history list, such that a data amount of the target record is less than or equal to a second preset threshold.

5. The method according to claim 1, wherein the target record comprises a first record in which a specific data item is deleted, wherein the first record has a same value as the specific data item of a corresponding record in the history list.

6. The method according to claim 1, wherein the difference between the corresponding records of the current list and the history list are determined based on a difference value between target data items of the corresponding records of the current list and the history list.

7. The method according to claim 6, wherein the target data items comprise a plurality of data items, and the difference between the corresponding records in the current list and the history list is a weighted sum of the difference value between the plurality of data items in the corresponding records in the current list and the history list.

8. The method according to claim 1, wherein the target record comprises a newly added record and/or a deleted record relative to the history list.

9. The method according to claim 8, wherein the deleted record in the target record only contains a main field.

10. The method according to claim 1, wherein before the sending list information, the method further comprises:

merging a plurality of original time records in a current list into one target time record, wherein different object identifiers in the plurality of original time records correspond to different times, and each object identifier in the target time record corresponds to a same time, and the list information comprises the target time record.

11. The method according to claim 10, wherein the merging a plurality of original time records in the current list into one target time record comprises:

adjusting a time accuracy of the plurality of original time records to obtain a plurality of intermediate time records corresponding to a same time, wherein the time accuracy of the original time records is a first time accuracy, a time accuracy of the intermediate time records is a second time accuracy, and the second time accuracy is smaller than the first time accuracy; and merging the plurality of intermediate time records into the target time record.

12. The method according to claim 11, wherein the adjusting a time accuracy of a plurality of original time records to obtain a plurality of intermediate time records corresponding to a same time comprises:

performing rounding off a time in the plurality of original time records according to the second time accuracy to obtain the plurality of intermediate time records.

13. The method according to claim 11, wherein a time length corresponding to the second time accuracy is greater than an update cycle of the original time records.

14. The method according to claim 10, wherein the plurality of original time records are time records in which the current list is updated relative to the historical list, and an object identifier in the target time record is an object identifier in time records in which the current list is not updated relative to the historical list, wherein a number of the object identifiers in the time records in which the current list is updated relative to the historical time record is greater than a number of object identifiers in the time records in which the current list is not updated relative to the historical time record.

15. An electronic device, comprising:
at least one processor; and
a memory in communication connection with the at least one processor; wherein
the memory has instructions executable by the at least one processor stored therein, and when the instructions are executed by the at least one processor, the at least one processor is caused to perform the method according to claim 1.

16. A method for transmitting list information, comprising:

receiving, in batches, list information belonging to a same webpage from a sending end by using a two-way communication protocol, wherein the list information comprises a target record, the target record is selected from a current list according to a difference between corresponding records in the current list and a historical list, wherein the target record is a partial record in the current list, the current list further comprises a remaining record except for the partial record, and a minimum value of a difference between the partial record and a corresponding record in the history list is greater than or equal to a maximum value of a difference between the remaining record and a corresponding record in the history list.

* * * * *